Jan. 2, 1934.  B. R. ANDRUS  1,942,016
SAW FILING DEVICE
Filed Jan. 22, 1932  2 Sheets-Sheet 1
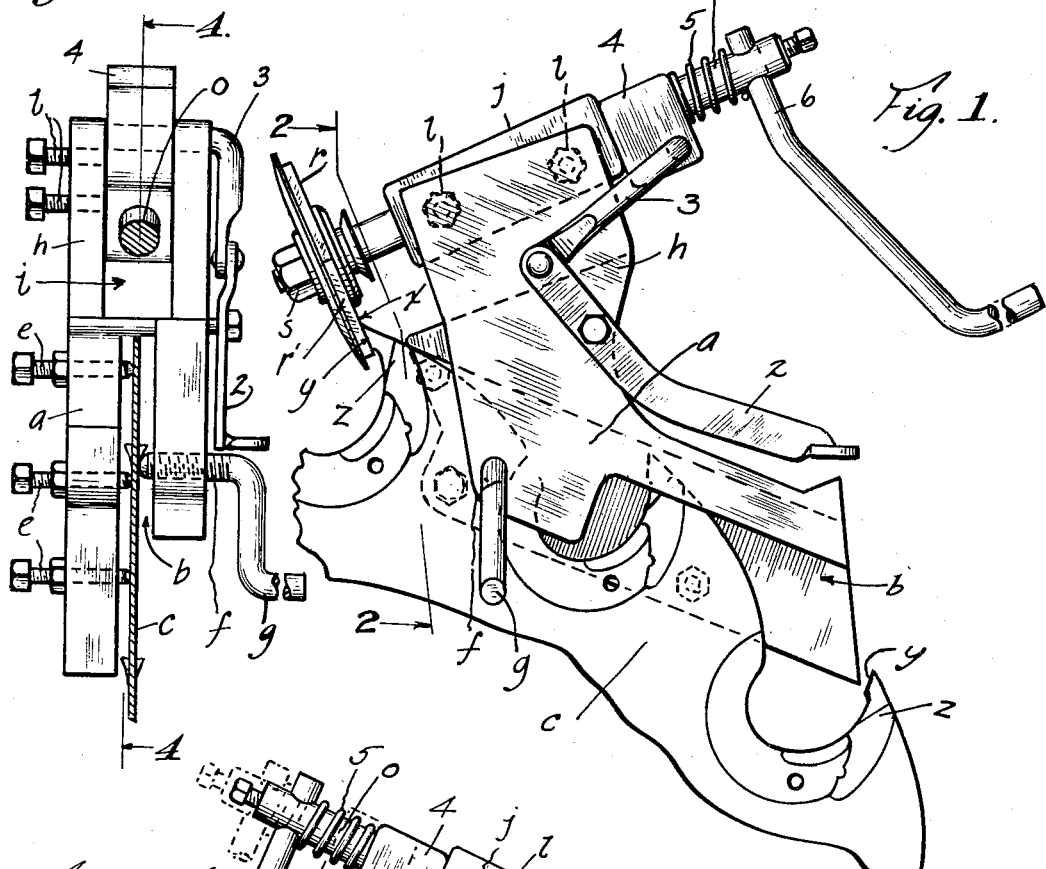
Inventor
Burton Roy Andrus
By
Attorney

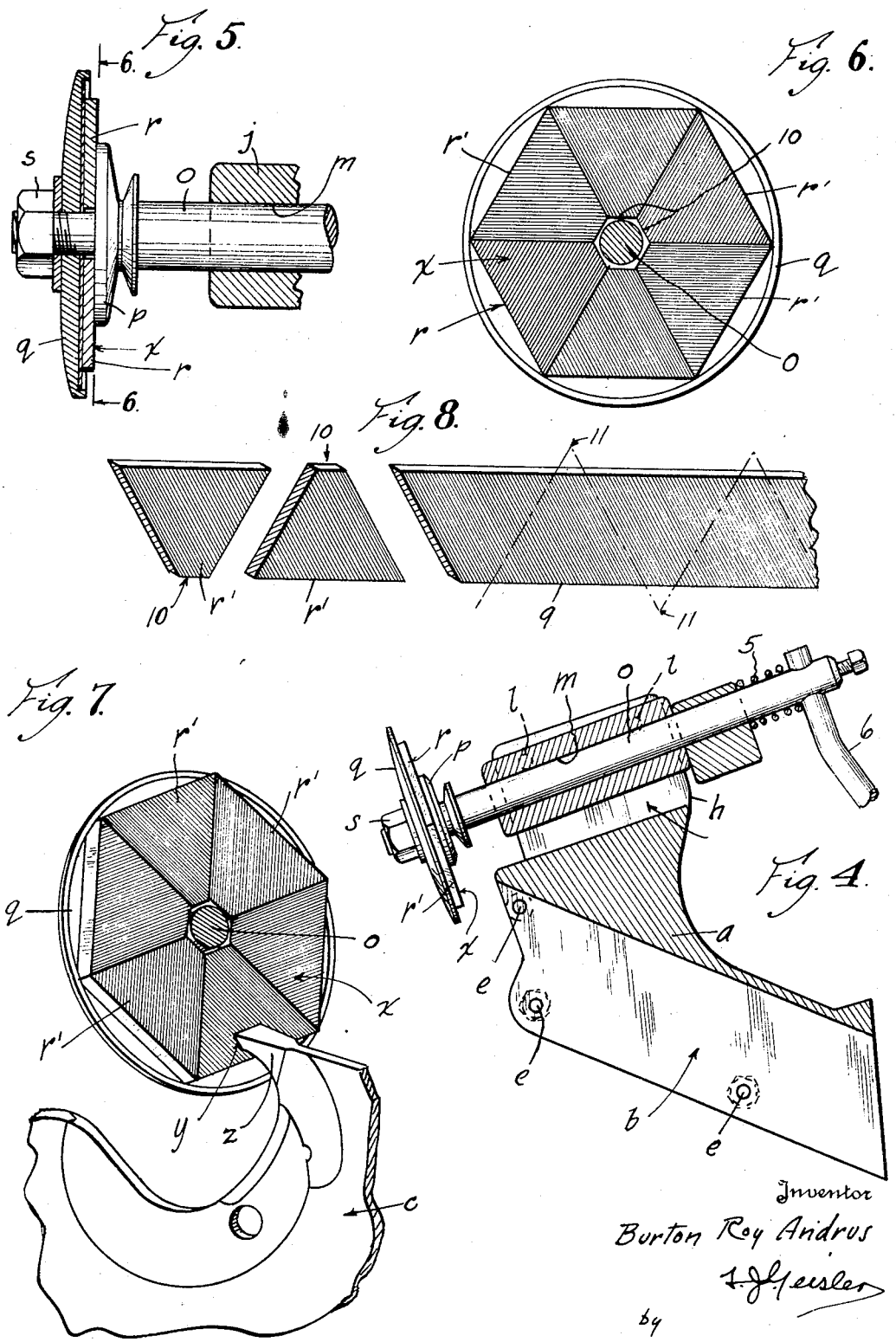

Patented Jan. 2, 1934

1,942,016

UNITED STATES PATENT OFFICE 1,942,016

SAW FILING DEVICE

Burton Roy Andrus, Eugene, Oreg.

Application January 22, 1932. Serial No. 588,115

4 Claims. (Cl. 76—41)

My invention relates to saw filing devices and the like.

The principal object of my invention is to provide a manually operated compact saw filing device which is simple in construction and particularly adapted for filing the removable teeth of circular saws without dismounting the latter from the saw blade.

A further object of my invention is to provide a saw filing device adapted to be clamped on the saw blade itself and provided with simple adjustments for the filing element, whereby the latter may be brought into correct alignment with the face of the saw tooth to be filed.

I attain my object in the device having the construction and mode of operation hereinafter fully described with reference to the accompanying drawings.

In the drawings:

Fig. 1 shows a side elevation of my saw filing device mounted in operative position upon a saw blade;

Fig. 2 shows a section taken on the line 2—2 of Fig. 1 and further illustrates how my saw filing device is clamped upon the saw blade;

Fig. 3 shows a side elevation of my saw filing device taken from the opposite side shown in Fig. 1 and illustrates further details of construction;

Fig. 4 shows a section taken on the line 4—4 of Fig. 2 and illustrates further details of construction;

Fig. 5 shows a fragmentary elevation of the arbor removed from the device, the file element and the arbor clamping means for the file element being shown in section to illustrate their relative arrangement;

Fig. 6 shows a section taken on the line 6—6 of Fig. 5 and illustrates the polygonal file element composed of a number of triangular file sections;

Fig. 7 shows a fragmentary view of a saw blade with the file element in position to operate upon the cutting face of the saw tooth; and Fig. 8 shows a flat file from which the triangular file sections are formed.

My invention comprises a body member $a$ provided with a longitudinal recess $b$ in one lateral edge and adapted to be mounted over the edge of a circular saw $c$, see Fig. 2. Set screws $e$ are provided on one side of the member $a$ adapted to bear against the side of the saw, and a clamping screw $f$ provided with a crank handle $g$ is threaded in the other side in a like manner for clamping the member $a$ upon the saw blade.

The member $a$ is provided with an integral extension $h$ projecting beyond the saw blade and provided with a longitudinal recess $i$ (see Fig. 2) for receiving a block or head $j$ adapted to be clamped in such recess in a desired position by set screws $l$ threaded in the side walls of the recess $i$.

The block or head $j$ is bored longitudinally as at $m$ and a shaft or arbor $o$ is slidably and rotatably mounted in such bore in the plane of the saw.

The end of the shaft or arbor $o$ adjacent the saw teeth constitutes an arbor for a disc-like file element $r$, having filing surfaces $x$ on its side faces and hereinafter further described. The file element $r$ is clamped upon said arbor, see Fig. 5 by a collar $p$, and a clamping plate $q$ held securely against the file element $r$ by a nut $s$. The clamping plate $q$ is of slightly greater diameter than the file element $r$ and is provided with a peripheral flange $q'$ adapted to hold the said file element on the shaft against lateral movement while the same is being clamped in place.

A bell crank lever 2 is pivotally secured on the side of the member $a$ and is connected by a link 3 with a member 4 slidably mounted upon the end of the shaft $o$ farthest from the file element $r$, and is held normally spaced from the end thereof by a coil spring 5 which bears against an operating handle 6 provided on the end of the said shaft $o$ and serves as means for holding the file element when in operative position in contact with the saw tooth.

In use, my filing device is mounted on the saw blade $c$ as illustrated in Figs. 1 and 2, and adjusted roughly to bring the filing surface of the file element $r$ adjacent the cutting face $y$ of the insertable saw tooth $z$.

The block or head $j$ is then closely adjusted and clamped in position by the set screws $l$ to bring the said file element $r$ in parallel relation with the cutting face $y$ of the saw tooth $z$.

The lever 2 is then depressed, as illustrated by the broken lines in Fig. 3 to draw the shaft $o$ and therewith the file element $r$ closely against the said saw tooth. At the same time the shaft $o$ is rotated conveniently by the other hand, and thus the file element is caused to operate upon the said saw tooth.

Referring now to Figs. 5 to 8, I will describe the file element $r$ which I have found preferable because of its economical features although any of the standard saw sharpening wheels can as well be used with my device.

Such file element $r$ comprises a number of, preferably six, equilateral triangular file sections $r'$ assembled to form a hexagonal file element, see Fig. 6. I have found it convenient to provide such file sections $r'$ by breaking an ordinary flat file 9 along spaced diagonal lines coincident with the grooves in the file and lying at supplementary angles to each other and at approximately 45 degrees with the edge of the file, as illustrated in Fig. 8.

I have further found that in order to provide a central space for the shaft $o$, that one of the apices of such triangular sections may be truncated, as at 10, by spacing the lines on which the file is broken, far enough apart to cause them to intersect outside the file, as at 11 in Fig. 8.

The file may be conveniently broken into the said triangular sections $r'$ by placing the same in a vise and then exerting a quick lateral pressure against it. Further, the grooves in the file, as mentioned, may be conveniently used as a guide for determining the lines upon which they should be broken, since, as is well known, the grooves of the file lie normally at an angle of 45 degrees with the side of the file and in opposite directions on the opposite sides of the file.

Thus a very economical file element is provided conveniently constructed from an ordinary flat file, the cost of which is considerably less than the standard disc-like grinding elements. Further, such file sections, when worn on one side, may be reversed and thus their period of usefulness is doubled.

I claim:

1. In a saw filing device, a body member adapted to be clamped on the saw blade, said body-member provided with an extension having a longitudinal recess, a head adjustably mounted in said recess, said head provided with a bore, an arbor rotatably located in said bore, and arranged for carrying a filing element in a plane normal to the saw and means carried by said arbor for holding said filing element in contact with the face of the saw tooth to be filed.

2. In a saw filing device, a body member adapted to be clamped on the saw blade, a longitudinal recess in said body member, a head adjustably mounted in said recess, said head provided with a bore, an arbor located in said bore, a filing element carried by said arbor in a plane normal to the saw, means carried by said arbor for holding said filing element in contact with the face of the saw tooth to be filed, and means for rotating said arbor.

3. In a saw filing device, a body member adapted to be clamped on the saw blade, a longitudinal recess in said body member, a head adjustably mounted in said recess, said head provided with a bore, a rotated arbor slidably located in said bore, and arranged for carrying a filing element in a plane normal to the saw and manual means connected to said arbor for holding said filing element in contact with the face of the saw tooth to be filed.

4. In a saw filing device, a body member adapted to be clamped on the saw blade, a longitudinal recess in said body member, a head adjustably mounted in said recess, said head provided with a bore, an arbor slidably and rotatably located in said bore, a filing element carried by said arbor in a plane normal to the saw, manual means connected to said arbor for holding said filing element in contact with the face of the saw tooth to be filed and means for rotating said arbor.

BURTON ROY ANDRUS.